(12) United States Patent
Pan et al.

(10) Patent No.: US 8,942,108 B2
(45) Date of Patent: Jan. 27, 2015

(54) METHOD AND SYSTEM FOR CURRENT DIFFERENTIAL PROTECTION

(71) Applicant: General Electric Company, Schenectady, NY (US)

(72) Inventors: Yan Pan, Niskayuna, NY (US); William James Premerlani, Scotia, NY (US)

(73) Assignee: General Electric Company, Niskayuna, NY (US)

(*) Notice: Subject to any disclaimer, the term of this patent is extended or adjusted under 35 U.S.C. 154(b) by 117 days.

(21) Appl. No.: 13/714,952

(22) Filed: Dec. 14, 2012

(65) Prior Publication Data

US 2014/0169157 A1 Jun. 19, 2014

(51) Int. Cl.
| | |
|---|---|
| H04L 12/28 | (2006.01) |
| H04L 12/24 | (2006.01) |
| H02J 13/00 | (2006.01) |
| H04J 3/06 | (2006.01) |
| H04L 12/40 | (2006.01) |

(52) U.S. Cl.
CPC ............. *H04L 41/0668* (2013.01); *H02J 13/00* (2013.01); *H04J 3/0638* (2013.01); *H04L 12/40* (2013.01); *H04L 41/0686* (2013.01); *H04L 41/12* (2013.01); *H04J 3/0641* (2013.01)
USPC ............................ 370/242; 370/406; 370/503

(58) Field of Classification Search
None
See application file for complete search history.

(56) References Cited

U.S. PATENT DOCUMENTS

| | | | |
|---|---|---|---|
| 4,709,365 A | 11/1987 | Beale et al. | |
| 5,958,060 A | 9/1999 | Premerlani | |
| 6,208,871 B1 | 3/2001 | Hall et al. | |
| 6,456,947 B1 | 9/2002 | Adamiak et al. | |
| 6,611,537 B1 * | 8/2003 | Edens et al. | 370/503 |
| 7,409,154 B2 | 8/2008 | Wellen | |
| 8,010,138 B2 | 8/2011 | Kuru | |
| 8,154,836 B2 | 4/2012 | Kasztenny et al. | |

(Continued)

FOREIGN PATENT DOCUMENTS

| | | |
|---|---|---|
| EP | 0440982 A3 | 8/1991 |
| WO | 9428643 A1 | 12/1994 |
| WO | 02071666 A1 | 9/2002 |
| WO | 2012061978 A1 | 5/2012 |

OTHER PUBLICATIONS

Adamiak et al., "A New Approach to Current Differential Protection for Transmission Lines", General Electric, Oct. 1998, 18 Pages.

(Continued)

*Primary Examiner* — Anh-Vu Ly
(74) *Attorney, Agent, or Firm* — Nitin J. Joshi

(57) ABSTRACT

A differential protection system is provided. The differential protection system includes a local terminal configured to be communicatively coupled directly or indirectly with at least two remote terminals via at least three communication links to form a ring topology or a mesh topology. The differential protection system further includes a controller comprising a communication link decision unit and a clock unit associated with the local terminal. The communication link decision unit is configured to determine some of the at least three communication links as virtually disconnected such that the ring topology or the mesh topology is configured to be converted to a daisy chain topology. The clock unit is configured to time synchronize the local terminal with at least one of the at least two remote terminals when the local terminal and the at least two remote terminals are configured in the daisy chain topology.

32 Claims, 8 Drawing Sheets

(56) References Cited

U.S. PATENT DOCUMENTS

| | | |
|---|---|---|
| 8,254,369 B2 | 8/2012 | Ono |
| 2002/0114354 A1 | 8/2002 | Sinha et al. |
| 2004/0090910 A1 | 5/2004 | Dzieduszko |
| 2006/0245454 A1* | 11/2006 | Balasubramanian et al. 370/509 |
| 2007/0076636 A1* | 4/2007 | Chow et al. ................. 370/258 |
| 2008/0019399 A1 | 1/2008 | Senba et al. |
| 2009/0024681 A1 | 1/2009 | Matoba |
| 2010/0188972 A1 | 7/2010 | Knapp |
| 2011/0223903 A1 | 9/2011 | Michel et al. |
| 2011/0249688 A1 | 10/2011 | Liu |
| 2011/0267854 A1* | 11/2011 | Flannery et al. ............. 363/72 |
| 2011/0268097 A1 | 11/2011 | Agrawala et al. |
| 2012/0106560 A1* | 5/2012 | Gumaste ..................... 370/401 |
| 2012/0147941 A1 | 6/2012 | Su et al. |
| 2013/0243140 A1* | 9/2013 | Buhl et al. .................. 375/362 |

OTHER PUBLICATIONS

"SIPROTEC 4 7SD5 Multi-End Differential and Distance Protection in One Relay", Siemens SIP, 2006, 7 Line Differential Protection / 7SD5, pp. 7/41-7/81.

"Transmission Line Protection Principles", General Electric, Dec. 2007, Downloaded from http://www.gedigitalenergy.com/smartgrid/Dec07/1-transmission.pdf on Nov. 27, 2012, pp. 7-16.

Beaumont et al., "Performance Evaluation of Current Differential Relays Over a Wide Area Network", Developments in Power Systems Protection, 2012. DPSP 2012. 11th International Conference on, Apr. 2012, pp. 1-16.

Pan et al., "Current Differential Protection",Pending U.S. Appl. No. 13/665,479, filed Oct. 31, 2012; 24 Pages.

* cited by examiner

METHOD AND SYSTEM FOR CURRENT DIFFERENTIAL PROTECTION

BACKGROUND

Most power system monitoring, protection, and control functions may be performed efficiently and accurately if power system measurements at multiple locations are synchronized. However, it may be generally difficult to accurately synchronize clocks separated by large distances. Conventional techniques to synchronize data or clocks may have different delays in different directions between a pair of locations which may lead to an error in data or clock synchronization.

An existing data or clock synchronization technique for current differential protection may use echo or ping-pong, which assumes that the sending and receiving delays are same. However, the reliability of this technique may depend on the symmetry of communication links. For example, the delays of sending and receiving communication links may differ due to change in the communication routing. In other conventional technique, global positioning system (GPS) is used for data or clock synchronization. However, the signal of GPS may not be always reliable enough to meet the requirement of the current differential protection system.

In addition to being important for multi-terminal power transmission, clock synchronization is important in many other applications such as power relays, determinations of sequences of events, economic power dispatch, and the like. Facilitating communications between various terminals at different locations is one solution; however, the main challenge in facilitating communications may be caused by a clock rollover. Generally the clocks utilized may be within a limited range to save communication bandwidth. The limited range may result in a clock rollover which may cause multi-terminal clocks to converge to a stable but non-synchronized condition.

In some solutions, three terminals may be connected in a ring topology or mesh topology such that protection may continue even if communications failed (for example, due to a fault in the communication link) between one pair of terminals. In one such solution, the synchronization may be achieved by averaging the computed time shifts at each terminal. However, for the ring/mesh topology, multi-terminals may present challenges for clock synchronization since every terminal must have timing information from both its neighbors. Therefore, if a communications link fails between a pair of terminals, the timing information may have to be rerouted through other terminal in the ring/mesh topology. However, rerouting time message may result in delay in transmitting and receiving messages, and may require additional message forwarding and associated complexity of coding.

Alternatively, in another synchronization solution for the ring/mesh topology, each terminal may synchronize to only one of its neighbors. Although this solution may be implemented for synchronizing three terminals; however, it may not be implemented in case of four or more terminals due to the formation of "synchronization islands." For example, in case terminals "A," "B," "C" and "D" are arranged in a ring communications topology, terminals A and B may synchronize to each other, and terminals C and D may synchronize to each other. However, in this example, the A-B synchronized pair may not synchronize with the C-D synchronized pair, thus resulting in "synchronization islands."

BRIEF DESCRIPTION

In accordance with one embodiment, a differential protection system is provided. The differential protection system includes a local terminal configured to be communicatively coupled directly or indirectly with at least two remote terminals via at least three communication links to form one of a ring topology or a mesh topology. The differential protection system further includes a controller comprising a communication link decision unit and a clock unit associated with the local terminal. The communication link decision unit is configured to determine at least one of the at least three communication links as virtually disconnected such that one of the ring topology or the mesh topology of the local terminal and the at least two remote terminals is configured to be converted to a daisy chain topology. The clock unit is configured to time synchronize the local terminal with at least one of the at least two remote terminals when the local terminal and the at least two remote terminals are configured in the daisy chain topology.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of terms such as "including," "comprising," or "having" and variations thereof herein are meant to encompass the items listed thereafter and equivalents thereof as well as additional items.

Additionally, for purposes of explanation, specific numbers, components, and configurations are set forth in order to provide a thorough understanding of various embodiments of the invention. The skilled artisan will recognize the interchangeability of various features from different embodiments. Similarly, the various method steps and features described, as well as other known equivalents for each such methods and features, can be mixed and matched by one of ordinary skill in this art to construct additional assemblies and techniques in accordance with principles of this invention.

Various embodiments of the present invention are directed to differential protection system and method that enable synchronization of clocks at multiple terminals of a power transmission system. Embodiments of the differential protection system and method disclosed herein may ensure that these terminals are synchronized irrespective of fault in one or communication links between terminals. Moreover, various embodiments disclose different clock synchronization logic to ensure that no "synchronization islands" are formed during clock synchronization between multiple terminals. For example, in case terminals A, B, C and D are arranged in a ring topology, terminals A and B may synchronize to each other, and terminals C and D may synchronize to each other. However, in this example, the A-B synchronized pair may not synchronize with the C-D synchronized pair; such a condition is herein referred to as "synchronization islands." While various embodiments of the clock synchronization will be described in the context of the power transmission system, it will be appreciated by those skilled in the art that the system and method may be used for other applications such as, but not limited to, power distribution systems, power relays, determinations of sequences of events, economic power dispatch, and any other situation requiring synchronization of clocks.

Figure 1:
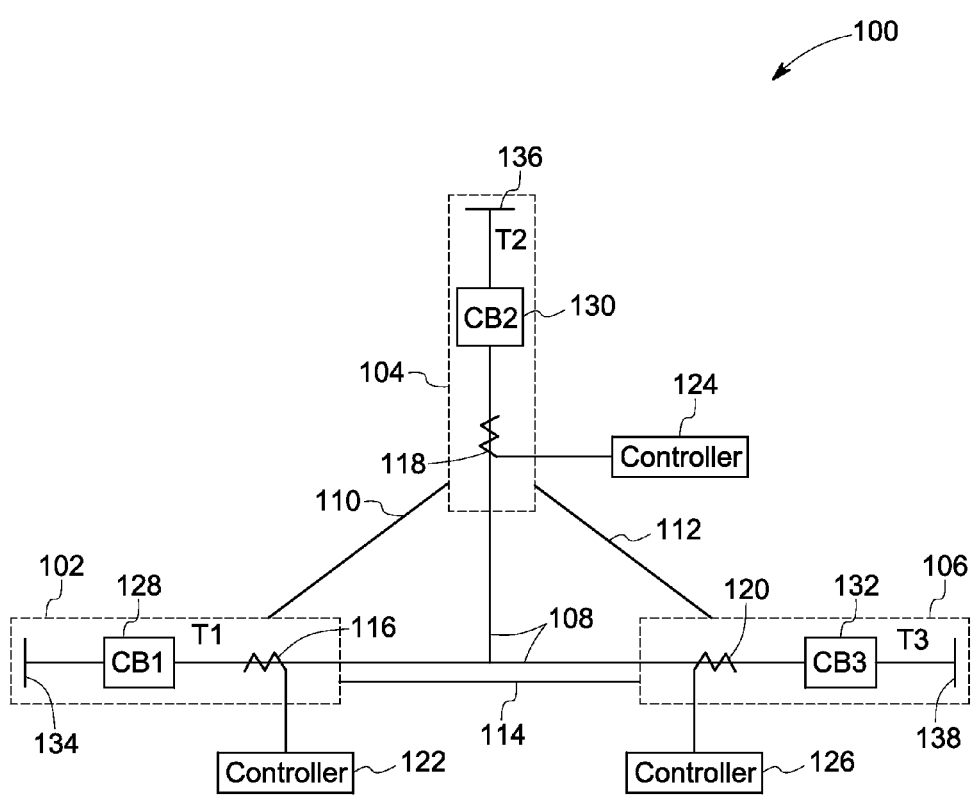
FIG. 1 is a block diagram of a differential protection system including three terminals arranged in a ring topology.

FIG. 1 is a block diagram of a differential protection system 100 (hereinafter referred to as "system 100") including three terminals 102, 104 and 106 arranged in a ring topology. The system 100 may be a current differential protection system, in accordance with some embodiments. The term "terminal" as used herein refers to a physically remote measurement device configured to provide protection for a power line 108 between the terminals 102, 104 and 106 of any voltage level. In one exemplary embodiment, an optical fiber or any other cable may be used as the power line 108. In an exemplary embodiment, the terminal may be a protection relay, for example, built on a common platform like a protection universal relay (UR) family. The protection relay used in the system 100 may be, for example, a line current differential relay L90. The number of terminals shown in FIG. 1 is exemplary and any number of terminals may be used without deviating from the scope of the invention.

In an exemplary embodiment, as shown in FIG. 1, the terminal 102 may be communicatively coupled to the terminals 104 and 106 directly or indirectly via three communication links 110, 112 and 114 to form the ring topology. In some embodiments, two or more communication links may be utilized between each pair of terminals to provide failover support in case of fault in one communication link. In one embodiment, the communication links 110, 112 and 114 may be replaced with any known type of wireless communications such as Wi-Fi, WiMAX, satellite communication, cellular network, and the like.

Further, as shown in FIG. 1, the terminals 102, 104 and 106 may include current sensors 116, 118 and 120, respectively, configured to sense current signals on the power line 108. The current sensors 116, 118 and 120 may be further configured to provide the sensed current signals to respective controllers 122, 124 and 126 in the system 100. As shown in FIG. 1, in some embodiments, the controllers 122, 124 and 126 may be communicatively coupled to the respective terminals 102, 104 and 106. Although the controllers 122, 124 and 126 are shown in FIG. 1 as separate components, it will be apparent to a person skilled in the art that these controllers or their functionalities may be integrated within the respective terminals without deviating from the scope of the invention.

In one embodiment, each of the controllers 122, 124 and 126 may include a processor, such as but not limited to at least one microprocessor, a microcontroller, a graphics processor, a digital signal processor (DSP), or any other type of processor or processing circuit. The processor may further include an input/output device, a memory such as a hard disk drive, a floppy disk drive, a compact disk-read/write (CD-R/W) drive, a digital versatile disc (DVD) drive, a flash drive, or a solid-state storage device.

In one embodiment, the controllers 122, 124 and 126 may detect fault conditions on the power line 108 by, for example, calculating differential current based on a difference of a "local current" and a "remote current" (or summation of "remote currents"). The current signal that is being measured at a local terminal is referred to as the "local current," and the current signals being measured at remote terminals are referred to as "remote currents." The term "local" as used herein indicates the terminal where the differential current is calculated or clock synchronization logic is applied. The term "remote" as used herein indicates a terminal that is located remotely with respect to the local terminal. Any terminal in the system 100 may act as a local terminal, in which case other terminals may act as remote terminals. In one example, the terminal 102 may act as "local terminal" if the differential current is calculated or the clock synchronization logic is applied at the terminal 102. In this example, the terminals 104 and 106, other than the local terminal 102, may then act as "remote terminals." In another example, the terminal 104 may act as "local terminal" if the differential current is calculated or the clock synchronization logic is applied at the terminal 104. In this example, the terminals 102 and 106, other than the local terminal 104, may then act as "remote terminals."

As shown in FIG. 1, the terminals 102, 104 and 106 may further include, among other components, respective circuit breakers 128, 130 and 132 and respective buses 134, 136 and 138. In some embodiments, the circuit breakers 128, 130 and 132 may be configured to electrically decouple the buses 134, 136 and 138 from the power line 108 in the event of a fault.

Components illustrated in the system 100 are exemplary and may also include various other components (not shown in FIG. 1) such as, but not limited to, a power source, an automatic voltage regulator (AVR), a step-up transformer, a line-side breaker, and one or more electrical loads. Moreover, in some embodiments, the circuit breaker 128, 130, 132 and the current sensor 116, 118, 120 may be located separate from the respective terminal 102, 104, 106.

Figure 2:
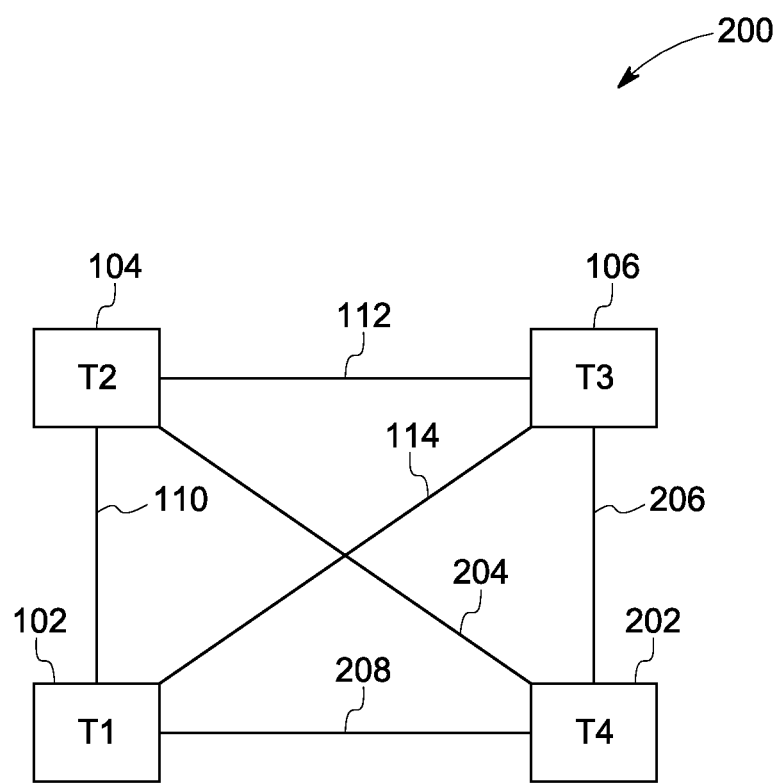
FIG. 2 is a block diagram of a mesh topology including four terminals.

FIG. 1 above describes the system 100 including three terminals 102, 104 and 106 arranged in a ring topology. FIG. 2 is a block diagram of a mesh topology 200 including four terminals 102, 104, 106 and 202. The components described above for the ring topology may be equally applied to the mesh topology 200 for use in a differential protection system (similar to the system 100). As shown in FIG. 2, in some embodiments, the terminal 102 may be communicatively coupled to the terminals 104, 106 and 202 directly or indirectly via six communication links 110, 112, 114, 204, 206 and 208 to form the mesh topology 200. The mesh topology shown in FIG. 2 is exemplary and any other type of mesh topology, for example, with any number of terminals or communication links may be realized without deviating from the scope of the invention.

Figure 3:
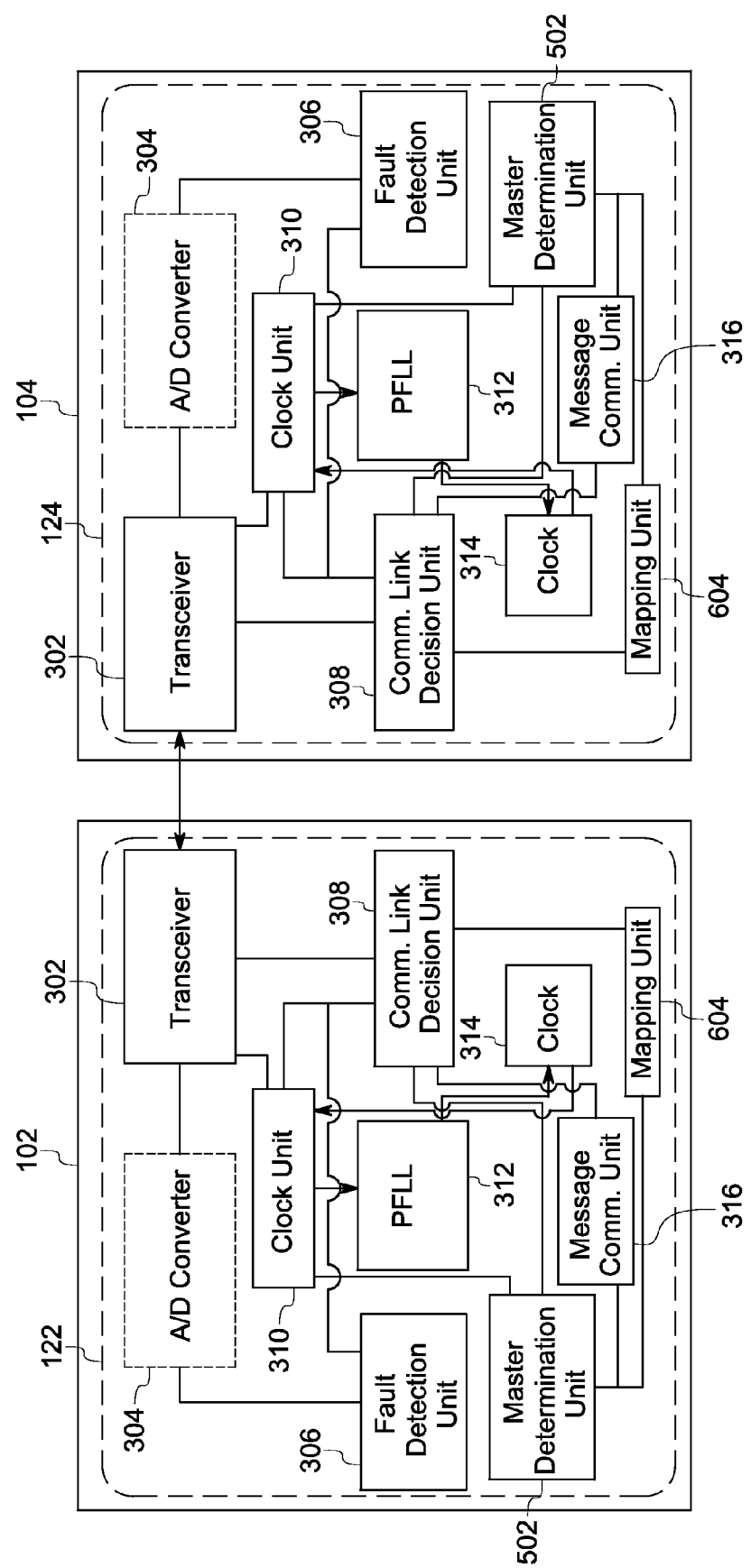
FIG. 3 is a block diagram representing an integrated architecture of controllers within two terminals, in accordance with one embodiment.

FIG. 3 is a block diagram representing an integrated architecture of the controllers 122 and 124 within the respective terminals 102 and 104, in accordance with one embodiment of the invention. Even though in FIG. 3 communication between only two terminals is shown, any number of terminals may be present with each terminal having its respective controller. As shown in FIG. 3, in some embodiments, each controller 122, 124 may include a transceiver 302 that may be configured to transmit and receive data to and from other controllers in the system 100. Alternatively, in some other embodiments (not shown), each controller 122, 124 may include separate transmitter and receiver for transmitting and receiving data over the communication link 110. The data exchanged between controllers may include, but not limited to, indexed current signals received at a local terminal from remote terminals, and timing information that may include time stamps included in a message exchanged between different terminals. For example, commonly assigned U.S. Pat. No. 5,958,060, entitled "Method and apparatus for clock control and synchronization," filed on Jan. 2, 1998, discloses the exchange of time stamps between multiple terminals. Other types of data exchanged between the controllers will be described later.

The controller 122, 124 may further optionally include an analog to digital (A/D) converter 304 (shown by dashed box) that may receive a current signal from a respective current sensor (not shown). Since the current signal received may be in analog form, the A/D converter 304 may be configured to convert the current signal received from the transceiver 302 into digital information that may be then fed to a fault detection unit 306 in the controller 122, 124. The fault detection unit 306 may be configured to detect fault conditions on the power line 108 as described above.

Figure 4:
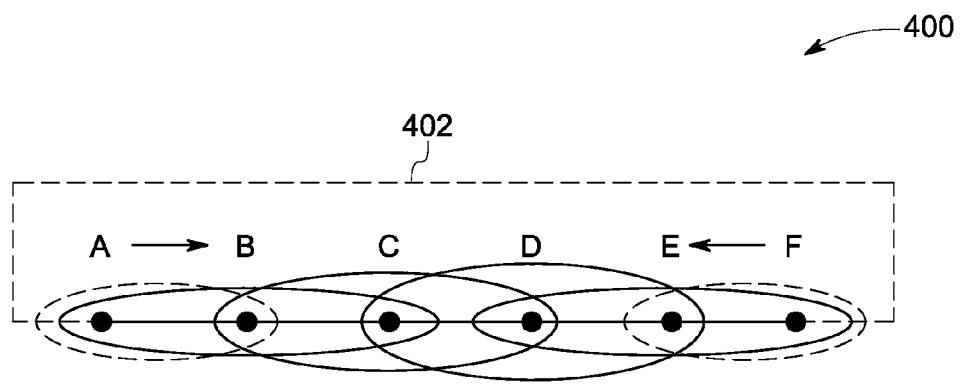
FIG. 4 shows a daisy chain topology of six terminals used for clock synchronization, in accordance with one embodiment.
Figure 5:
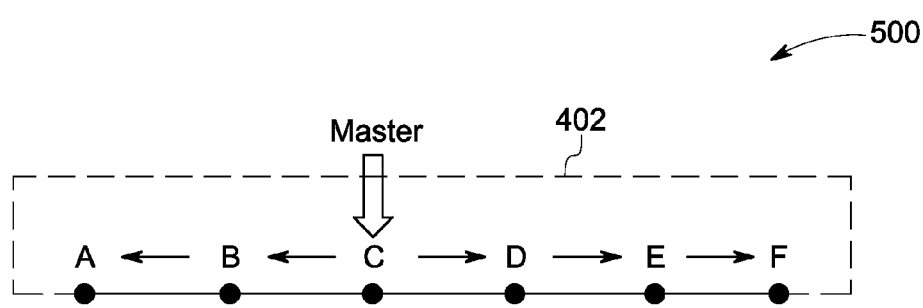
FIG. 5 shows a daisy chain topology depicting unidirectional synchronization of slave terminals towards a master terminal, in accordance with another embodiment.

As shown in FIG. 3, in some embodiments, the controller 122, 124 may further include a communication link decision unit 308 (hereinafter referred to as "decision unit 308") communicatively coupled to a clock unit 310 and the transceiver 302. In one embodiment, the decision unit 308 may be communicatively coupled to the fault detection unit 306 also. In some embodiments, the decision unit 308 may be configured to determine one or more of the communication links (such as 110, 112, and 114) between terminals configured in the ring topology as virtually disconnected such that the ring topology (such as shown in FIG. 1) is configured to be converted to a daisy chain topology. Exemplary embodiments are depicted in FIGS. 4 and 5 where six terminals are shown as connected serially (i.e., in a daisy chain topology) with communication link between terminals A and F (referred to as "AF") at the end of the daisy chain topology being considered as "virtually disconnected." The term "virtually disconnected" as used herein refers to a communication link that is hypothetically considered as broken or disconnected (by terminals) to indicate that only clock information such as timing information embedded in messages exchanged between terminals via such a link should be discarded or not used, even though these terminals may still exchange messages via such a link.

In one embodiment, a central controller (not shown), instead of the controller (such as 122 or 124) in the respective terminal, may determine one or more communication links as virtually disconnected.

In some embodiments, the decision unit 308 may define a particular communication link as virtually disconnected based on a priority list (referred to as "first defined priority list"). In such embodiments, each terminal may be assigned a priority by, for example, a controller located in each terminal or a common controller at a central location. In one embodiment, the terminal with the highest priority may be determined as virtually disconnected. It will be apparent to a person skilled in the art that various factors may be used to define the priorities. In one exemplary embodiment, the terminal with better reliability or strong global positioning system (GPS) connection or both may have higher priority than the terminal that has comparatively lesser reliability or weaker GPS connection or both. In another exemplary embodiment, a priority number may be defined by an electrical operator through a display unit (not shown) randomly. Further, in some embodiments, the central controller or the terminals directly coupled to the virtually disconnected communication link may send messages (referred to as "first messages") to indicate the virtually disconnected communication link to all other terminals. In an exemplary embodiment shown in FIG. 3, the controller 122, 124 may further include a message communication unit 316 configured to exchange one or more first messages between the local terminal and remote terminals, or among remote terminals, or both. This embodiment is described later in detail in conjunction with FIG. 7.

In some embodiments, each terminal arranged in the ring topology may be defined with connection information that may include a total number of terminals and the connection arrangement or connection architecture of these terminals. In one embodiment, the central controller may be configured to dynamically update all terminals with current or any change in the connection information. In an embodiment, when the ring topology is converted into the daisy chain topology, each terminal may be configured to be dynamically updated with the modified connection information. Alternatively, in another embodiment, each terminal may be pre-configured with the connection information. In such embodiments, a terminal may update all other terminals whenever there is any change in the connection arrangement between, for example, a pair of terminals.

In some embodiments, the clock unit 310 may be configured to receive the information from the decision unit 308 that the ring topology is being converted to the daisy chain topology. In one embodiment, this information may be communicated to the clock unit 310 in the form of a message that may indicate which communication link is virtually disconnected and/or may include connection information of the daisy chain topology (such as shown in FIGS. 4 and 5). In some embodiments, the clock unit 310 may be configured to calculate an overall time delay or clock offset used for clock synchronization at each terminal as described later in conjunction with various embodiments of FIGS. 4 and 5.

Further, in some embodiments, the clock unit 310 may provide the calculated clock offset as a phase input to a phase-frequency locked loop (PFLL) 312 implemented in each terminal. An exemplary PFLL is disclosed in commonly assigned U.S. Pat. No. 5,958,060. In some embodiments, the PFLL 312 may provide a signal to a clock 314 to adjust clock's frequency that may cause the relative timing error between clocks 314 of a pair of terminals (such as 102 and 104) to zero. The term "relative timing error" as used herein refers to minimizing or eliminating the overall time delay or clock offset between a pair of terminals, for example, to or nearly zero. In some embodiments, the clock 314 may be within a limited range to save communication bandwidth. In one embodiment, the clock 314 may be integrated with the clock unit 310.

In some embodiments, if the relative timing error is not as desired, for example, more than zero due to any disturbance or noise in the system 100, the process for clock synchronization may be repeated. In such embodiments, the clock 314 may provide a clock signal to the clock unit 310 to achieve clock synchronization with zero relative timing error. In one exemplary embodiment, the clock unit 310 may use the clock signal received from the clock 314 to time synchronize a local terminal (such as 102) with one or more remote terminals (such as 104 and 106) such that the relative timing error is zero. In one exemplary embodiment, in order to achieve zero relative timing error, the clock unit 310 may again calculate clock offset, which may be input to the PFLL 312 as a phase input. In such embodiments, the PFLL 312 may then provide a signal to the clock 314 to adjust clock's frequency that may cause the relative timing error between clocks 314 of a pair of terminals to zero.

FIG. 3 has been described above for the ring topology; however, various embodiments described above for the ring topology may be equally applied to the mesh topology as well. Referring to FIG. 2, in some embodiments with four terminals arranged in the mesh topology, if two communication links are determined as faulty (referred to as "faulty communication links"), the mesh topology may be converted to either a daisy chain topology where at least one terminal is not connected to two other terminals, or a ring topology (for example, when the communication links 114 and 204 are faulty). In the former case, in one embodiment, one or more communication links (other than the two faulty communication links) may be considered as virtually disconnected so as to form a daisy chain topology (similar to that described above for ring topology). In the latter case, in some embodiments, the ring topology may be then converted to a daisy chain topology. Alternatively, in some other embodiments, even when no communication link is faulty, the mesh topology may be converted to a daisy chain topology by determining two or more communications links, for example, in the mesh topology of FIG. 2, as virtually disconnected to form a daisy chain topology.

It should be noted that components of the controller 122, 124 shown here are exemplary and some components may be modified, added or removed as per the requirement. For example, in one embodiment, the transceiver 302 may exchange signals with more than one terminal and accordingly the components may be modified and added.

In order to provide accurate and efficient synchronization between multiple terminals, various embodiments of the present invention provide clock synchronization logic that uses one or more neighboring terminals. The clock synchronization logic may also ensure that no "synchronization islands" are formed during clock synchronization between multiple terminals.

One such clock synchronization logic is described in conjunction with FIG. 4. FIG. 4 shows a daisy chain topology 400 of six terminals A-F used for clock synchronization, in accordance with one embodiment. FIG. 4 considers that the six-terminal ring topology is converted into the daisy chain topology 400 such that a communication link 402 (shown by dashed line) between terminals A and F is determined as virtually disconnected. The configuration shown in FIG. 4 has terminals A and F acting as opposing end terminals with other terminals B-E acting as intermediate terminals. In some embodiments, in order to synchronize each terminal A-F in the daisy chain topology 400, the clock unit 310 in the respective terminal may be configured to apply clock synchronization logic. In one such embodiment, in order to synchronize any of the opposing end terminals A and F, the clock unit 310 in the respective terminal A or F may be configured to receive timing information from a neighboring terminal of the respective terminal (A or F) to be synchronized. The term "neighboring terminal" as used herein refers to an adjacent terminal that communicates directly with and is at closest distance from the terminal to be synchronized. As shown in FIG. 4, the neighboring terminal of the opposing end terminal A is terminal B whereas the neighboring terminal of the opposing end terminal F is terminal E. In one embodiment, the clock unit 310 may receive the timing information via the transceiver 302.

In some embodiments of the clock synchronization logic, the clock unit 310 in the respective opposing end terminal may further time synchronizing the opposing end terminal with the neighboring terminal (shown by dashed ovals) based on the received timing information from the neighboring terminal. In one exemplary embodiment, the clock unit 310 in the opposing end terminal A may determine time delay between terminal A and the neighboring terminal B (referred to as "$T_{AB}$") using time stamps in the received timing information, for example, as disclosed in U.S. Pat. No. 5,958,060. In some embodiments, the determined time delay may be then used to time synchronize the opposing end terminal with the neighboring terminal.

In one embodiment, in order to synchronize any of the intermediate terminals B-E, the clock unit 310 in the respective terminal (B, C, D or E) may be configured to receive timing information from two neighboring terminals of the intermediate terminal to be synchronized. For example, as shown in FIG. 4, terminals A and C are the two neighboring terminals of the terminal B, terminals B and D of the terminal C, and so on. In some embodiments of the clock synchronization logic, the clock unit 310 in the intermediate terminal may further determine time delays between the intermediate terminal and the two neighboring terminals based on the received timing information. In one exemplary embodiment where the intermediate terminal B is to be synchronized, the clock unit 310 in the terminal B may determine time delay between terminals B and A (referred to as "$T_{BA}$"), and time delay between terminals B and C (referred to as "$T_{BC}$").

Further, in some embodiments, the clock unit 310 in the intermediate terminal may be further configured to calculate an average of the determined time delays between the intermediate terminal and the two neighboring terminals (shown by solid ovals). In an exemplary embodiment where the intermediate terminal B is to be synchronized, the clock unit 310 may calculate an overall time delay (referred to as "average clock offset" for intermediate terminals) for the terminal B, using the following equation:

$$T_B = (T_{BA} + T_{BC})/2 \quad \text{(eq. 1)}$$

where, $T_B$ refers to an average clock offset of terminal B

In various embodiments, the average clock offsets may be similarly calculated for other intermediate terminals. In some embodiments, the calculated average clock offset may be then used to time synchronize the intermediate terminal with the two neighboring terminals.

Alternatively, in some embodiments, if the time delay determined between a pair of terminals (as determined from embodiments of FIG. 4 or FIG. 5) indicates large asymmetries, the existing GPS approach may be used for clock synchronization purpose.

FIG. 4 considers the exemplary embodiment where a ring topology is converted to the daisy chain topology; however, it will be apparent to a person skilled in the art various embodiments described for conversion of the ring topology may be equally applied for conversion of a mesh topology to a daisy chain topology as described above.

FIG. 4 above described one embodiment of clock synchronization logic that may be applied to multi-terminals in the differential protection system (such as 100). FIG. 5 shows a daisy chain topology 500 depicting unidirectional synchronization of slave terminals towards a master terminal, in accordance with another embodiment. In some embodiments, the clock units in the respective terminals A-F in the daisy chain topology 500 may be configured to apply different clock synchronization logic for synchronization purpose. As shown in FIG. 5, the architecture of the daisy chain topology 500 may be similar to that of the daisy chain topology 400. Moreover, various embodiments applicable for the daisy chain topology 400 may be equally applied to the daisy chain topology 500. For example, similar to the daisy chain topology 400, FIG. 5 considers that ring or mesh topology is converted into the daisy chain topology 500 such that the communication link 402 (shown by dashed line) between terminals A and F is determined as virtually disconnected.

The clock synchronization logic in FIG. 5 may use a master determination unit 502 (shown in FIG. 3) in the respective controller (such as 122, 124 as shown in FIG. 3). In some embodiments, the master determination unit 502 may be communicatively coupled to the clock unit 310. In one embodiment, the master determination unit 502 may be first configured to determine one of the six terminals A-F as a master terminal, and further configured to define terminals other than the master terminal as slave terminals. In some embodiments, the terminal that is initially determined (that is, when configuration is done for the first time) by the master determination unit 502 as the master terminal is referred to as "first master terminal." The master determination unit 502 may be further configured to communicate the first master terminal and slave terminals to the clock unit 310. Moreover, in some embodiments, the master determination unit 502 may dynamically modify the master and slave terminals during operation, and therefore may inform the clock unit 310 and other terminals in the event of such modifications.

Similar to the use of priorities for determining virtually disconnected communication link, the master determination unit 502 may be configured to determine the master terminal based on a priority list (referred to as "second defined priority list"). In one embodiment, the second defined priority list may be same or different from the first defined priority list.

FIG. 5 assumes the terminal C as the first master terminal, in accordance with an exemplary embodiment. In one such embodiment, in order to synchronize the slave terminals A, E and F that have at least one slave terminal between them and the first master terminal C, the clock unit 310 in the respective slave terminal (to be synchronized) may be configured to receive timing information from its neighboring terminal that is nearest to the first master terminal C. In one exemplary embodiment as shown in FIG. 5, in order to synchronize slave terminal A, the clock unit 310 in the slave terminal A may receive timing information from the slave terminal B, which is terminal A's only neighbor and nearest to the first master terminal C. In another exemplary embodiment, in order to synchronize slave terminal E, the clock unit 310 in the slave terminal E may receive timing information from the slave terminal D, which is terminal E's neighbor and also nearest (in comparison to other neighbor F) to the first master terminal C.

In some embodiments, in order to synchronize any slave terminal (assuming terminal A) that has at least one slave terminal (terminal B) between itself and the first master terminal C, the clock unit 310 in the slave terminal A may time synchronize to its neighboring terminal B nearest to the first master terminal C, based on the received timing information. In such embodiments, the terminal B may also similarly time synchronize to terminal B's neighboring terminal C, which is the first master terminal. In some embodiments, prior to synchronizing time of the slave terminal A to the neighboring terminal B, the terminal B may synchronize time to its neighboring terminal C since if the terminal B is not already time synchronized, the terminal A may end up synchronizing to the unsynchronized terminal B. The unidirectional time synchronization is depicted in FIG. 5 with arrows between terminals to signify the order in which the time synchronization will be performed for the terminals. For example, in order to time synchronize terminal F, terminal D will be first time synchronized to the first master terminal C, terminal E will then time synchronize to the synchronized terminal D, and finally the terminal F will synchronize time to the synchronized terminal E. The determination of time delay based on the received timing information and time synchronizing a terminal using the determined time delay as described above in conjunction with various embodiments of FIG. 4 may be equally applied here.

Further, in some embodiments, in order to synchronize the slave terminals B and D that have first master terminal C as one of their neighboring terminals, the clock unit 310 in the respective slave terminal B or D may be configured to receive timing information directly from the first master terminal C. In some embodiments of the clock synchronization logic, the clock unit 310 in the respective slave terminal B or D may further time synchronize the slave terminal B or D directly with the first master terminal C based on the received timing information.

In various embodiments, the master terminal may be determined based on different criteria. Once such criterion that uses priorities to determine the master terminal is described above. In some embodiments, a central controller (not shown), similar to the central controller used to determine virtually disconnected link, may be used to determine the master terminal, and inform all terminals about the connection information and any subsequent change in the connection information during operation. Various embodiments described above for the central controller may be equally applied here. Alternatively, in some other embodiments, each terminal may be pre-configured with the connection information. In such embodiments, the terminals may update each other whenever there is any change in the connection arrangement, for example, fault in a communication link between a pair of terminals.

Figure 9:
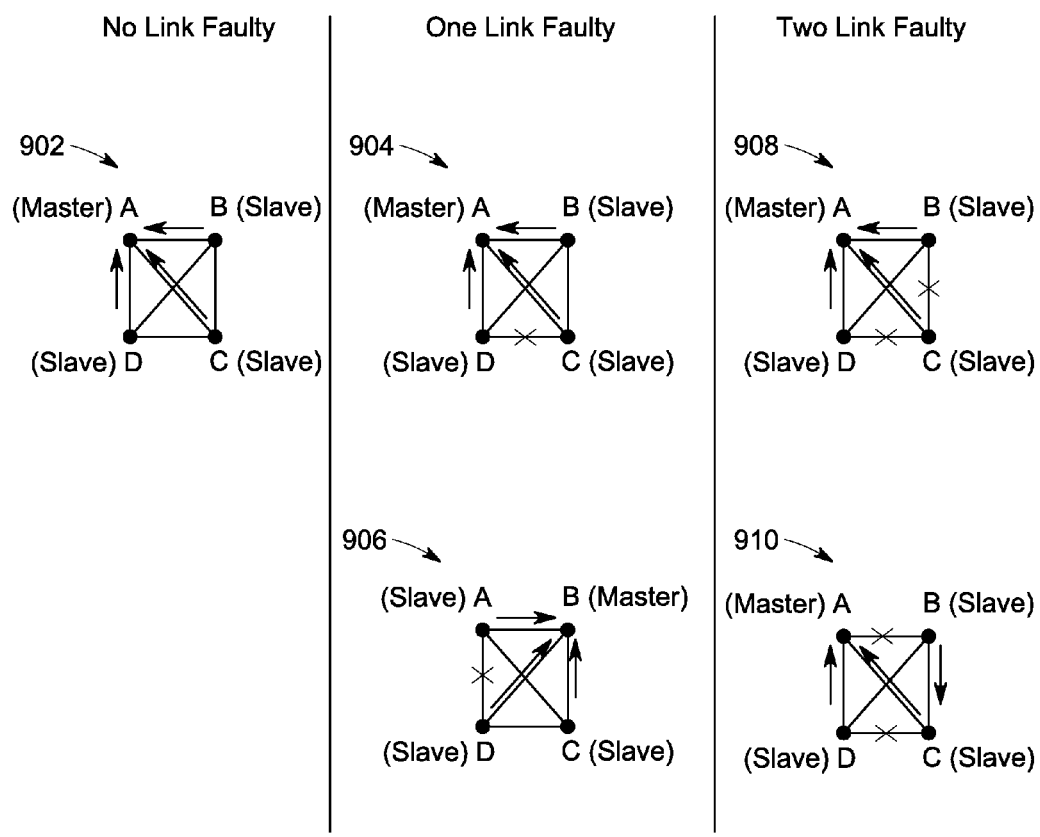
FIG. 9 illustrates different configurations to handle communication link fault for four terminals arranged in a mesh topology, in accordance with another embodiment.

In one exemplary embodiment of the mesh topology, each terminal in the mesh topology may determine if it may act as the master terminal. In this embodiment, the first criterion for being a potential candidate for the master terminal may be that a terminal should have connection to all other terminals in the mesh topology (for example, as depicted in FIGS. 2 and 9). Referring to FIG. 2, in one exemplary embodiment, any terminal in the mesh topology 200 may potentially act as the master terminal since every terminal has connection to all other terminals in the mesh topology 200. In some embodiments, a second level screening (referred to as "second criterion") may be applied to select the master terminal from the list of potential candidates, for example, using priorities assigned to all terminals.

Figure 6:
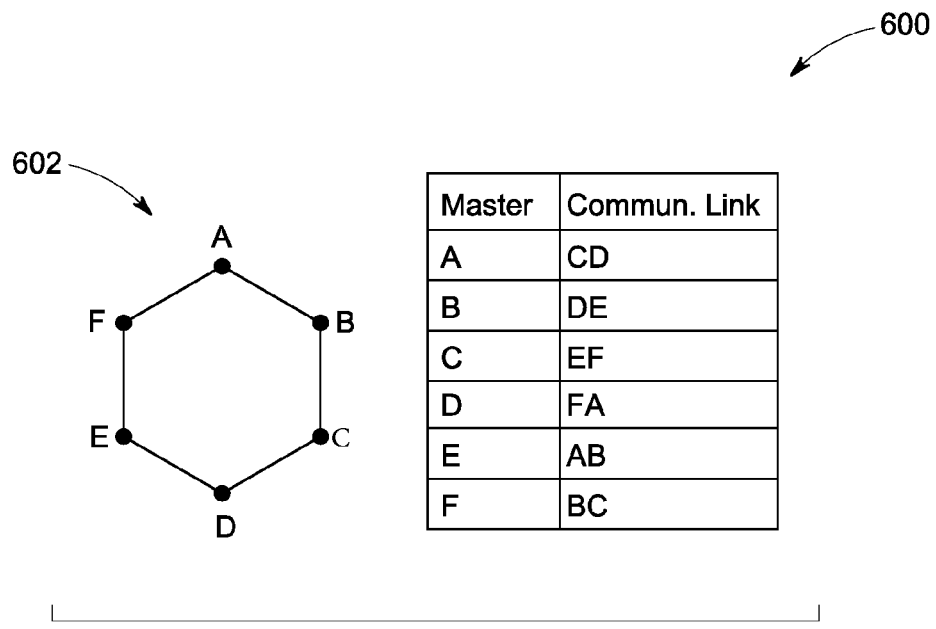
FIG. 6 illustrates a mapping table that provides an exemplary mapping relationship between virtually disconnected communication links and corresponding master terminals for six terminals arranged in a ring topology, in accordance with an embodiment.

Alternatively, in some embodiments, the master determination unit 502 may determine the master terminal based on the virtually disconnected communication link. In one embodiment, the master determination unit 502 may be communicatively coupled to the decision unit 308 such that the master determination unit 502 may be configured to receive data indicating the virtually disconnected communication link from the decision unit 308. In such embodiments, the master determination unit 502 may be configured to determine the master terminal based on this received data. FIG. 6 illustrates a mapping table 600 that provides an exemplary mapping relationship between virtually disconnected communication links and corresponding master terminals for the six terminals A-F configured in a ring topology 602, in accordance with one embodiment. Referring to FIG. 3, the controller 122, 124 may further include a mapping unit 604 configured to store a mapping between the master terminal and the virtually disconnected communication link. Alternatively, a centrally located controller (not shown) may include the mapping unit 604.

In one exemplary embodiment where a communication link between terminals C and D (referred to as "CD") is determined as virtually disconnected communication link, the master determination unit 502 may be communicatively coupled to the mapping unit 604 and may be configured to receive the mapping relationship for the communication link CD from the mapping unit 604. The received mapping relationship may be sent in a message including the mapping relationship for the communication link CD, which indicates the corresponding master terminal as terminal A. In one embodiment, the master determination unit 502 may then set terminal A as the master terminal. Similarly, the master determination unit 502 may determine the master terminal for any other virtually disconnected communication link as shown in the mapping table 600. It will be apparent to a person skilled in the art that the number of terminals and the mapping relationship shown in FIG. 6 are exemplary, and any number of terminals and any other mapping relationship may be defined without deviating from the scope of the invention. In some embodiments, the electrical operator may define or modify the mapping relationship during operation.

In another embodiment, a master terminal may be determined prior to determining a virtually disconnected communication link. In one exemplary embodiment, once the master terminal is determined, the decision unit 308 may be configured to receive data, for example, in a message indicating the determined master terminal from the master determination unit 502. In this embodiment, the decision unit 308 may be configured to determine the virtually disconnected communication link based on this received data. In some embodiments, the decision unit 308 may be communicatively coupled to the mapping unit 604 and may be configured to receive mapping relationship for the master terminal from the mapping unit using the mapping table 600. The received mapping relationship may be sent in a message including the mapping relationship for the master terminal such as master terminal B, which indicates the corresponding virtually disconnected communication link to be a communication link between terminals D and E (referred to as "DE").

Further, in some embodiments, irrespective of the technique used to determine the master terminal, once the master terminal is determined, the central controller or the master terminal may send messages to indicate the master terminal to all other terminals. In some embodiments, the message communication unit 316 may be configured to exchange such messages between the local terminal and remote terminals, and among remote terminals depending upon which terminal is determined as the master terminal. The data indicating the master terminal may be either included along with the data indicating the virtually disconnected communication link in the first message, or exchanged with all slave terminals in a different message, in accordance with some embodiments.

Further, in some embodiments, the fault detection unit 306 in the controller 122, 124 may be configured to detect a fault in a communication link (for example, in the communication link 112 of FIG. 1). It will be apparent to a person skilled in the art that any existing technique for fault detection may be used here to detect communication link fault. In some embodiments, in the event of the communication link fault, the decision unit 308 may be configured to receive an indication from the fault detection unit 306 for the fault in the communication link. The indication may include identification (ID) of faulty communication link. Further, in some embodiments where the faulty communication link may be different from the determined virtually disconnected communication link, the decision unit 308 may be configured to define the determined virtually disconnected communication link as an operational link. The term "operational link" as used herein refers to a communication link that is physically connected to respective terminals (and hence operational) and is capable of communicating data between these terminals. The decision unit 308 may further define the communication link having fault as the faulty communication link (depicted by "R" in FIG. 7; signifying "real" disconnected communication link) based on the indication received from the fault detection unit 306.

Once the decision unit 308 has defined the virtually disconnected communication link as operational and another communication link as faulty, the central controller or the message communication unit 316 in respective terminal may be configured to inform about this modification in the connection arrangement to all other terminals, in accordance with some embodiments. Further, in some embodiments, the master determination unit 502 may be configured to replace the initially determined master terminal ("first master terminal") with another terminal (referred to as "second master terminal"), when the faulty communication link is different from the determined virtually disconnected communication link. In one exemplary embodiment, the second master terminal may be determined using the mapping relationship provided in the mapping table 600. Even though the mapping table 600 above is described to provide the mapping relationship between master terminal and virtually disconnected communication links; however, in such embodiments, the mapping table 600 may be replaced with a corresponding mapping table that may provide the mapping relationship between master terminals and corresponding faulty communication links (instead of the corresponding virtually disconnected communication links). In some other embodiments, the first master terminal may be replaced with the second master terminal due to any other reason, for example, due to modification in the priorities of the terminals. The modification in the connection arrangement may be updated by the second master terminal or the central controller to all other terminals similar to that described above.

Figure 7:
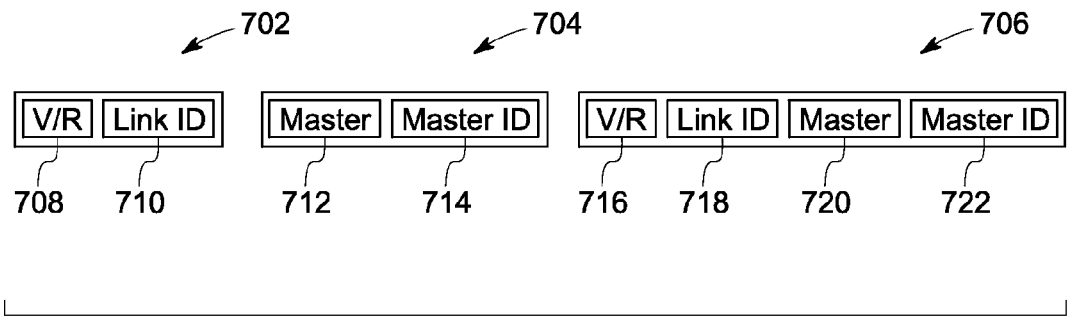
FIG. 7 illustrates exemplary message formats that are used to exchange messages between multiple terminals, in accordance with one embodiment.

In various embodiments, as explained above for the daisy chain topology 400 or 500, the messages may be exchanged between various terminals to indicate the virtually disconnected communication link, the master terminal (which may be, for example, first or second master terminal), or both. FIG. 7 illustrates exemplary message formats 702, 704 and 706 that may be used to exchange messages between terminals, in accordance with one embodiment. As shown in FIG. 7, in some embodiments, the message format 702 may include data (referred to as "first data") indicating a virtually disconnected communication link (depicted by "V," which indicates the status of a communication link as virtually disconnected) in its first bit 708, and a first ID of the virtually disconnected communication link (depicted by "link ID" and referred to as "first link ID") in its second bit 710. In some embodiments, the message communication unit 316 in the respective terminal may be configured to exchange messages having such a message format (referred to as "first messages") with other terminals. In one exemplary embodiment, the first message may include first data indicating the virtually disconnected communication link or a first master terminal.

In some other embodiments, the first bit may instead include data (referred to as "second data") indicating a faulty communication link (depicted by "R" in FIG. 7; "R" may indicate a status that a fault exists in a communication link). In such embodiments, the link ID in the second bit may correspond to an ID of the faulty communication link (referred to as "second link ID"). In some embodiments, the message communication unit 316 in the respective terminal may be configured to exchange messages having such a message format (referred to as "second messages") with other terminals. In one embodiment, a terminal may communicate data indicating virtually disconnected communication link as operating normally to various terminals either in a third bit (not shown) or in a separate message (also not shown). Alternatively, in another embodiment, upon detecting a message including data indicating the faulty communication link may automatically trigger respective terminal to configure the virtually disconnected communication link as operating normally.

Further, as shown in FIG. 7, in some embodiments, another message format 704 may include first data indicating a master terminal (depicted by "master," which indicates the type of message content, and referred to as "first master terminal") in its first bit 712, and an ID of the first master terminal (depicted by "master ID" and referred to as "first master ID") in its second bit 714. In some embodiments, messages exchanged with such a message format are also referred to as "first messages."

Alternatively, in some other embodiments, the message format 704 may include second data indicating a master terminal (depicted by "master" and referred to as "second master terminal") in its first bit 712, and an ID of the second master terminal (depicted by "master ID" and referred to as "second master ID") in its second bit 714. In some embodiments, messages exchanged with such a message format are referred to as "second messages."

In some other embodiments, the message format 706 may be a combination of the message formats 702 and 704 such that a first bit 716 of the message format 706 may include "V" or "R" (depicted by "V/R," which indicates the type of message content), a second bit 718 of the message format 706 may include link ID corresponding to V/R in the first bit 716, a third bit 720 of the message format 706 may include data indicating master terminal, and a fourth bit 722 of the message format 706 may include ID corresponding to the master terminal in the third bit 720.

Any other known clock synchronization logic may be used once the ring topology or mesh topology is converted to the daisy chain topology, without deviating from the scope of the invention. For example, the existing master-slave approach may be used to synchronize the terminals of a mesh topology by selecting a master terminal and synchronizing slave terminals directly with the selected master terminal.

Figure 8:
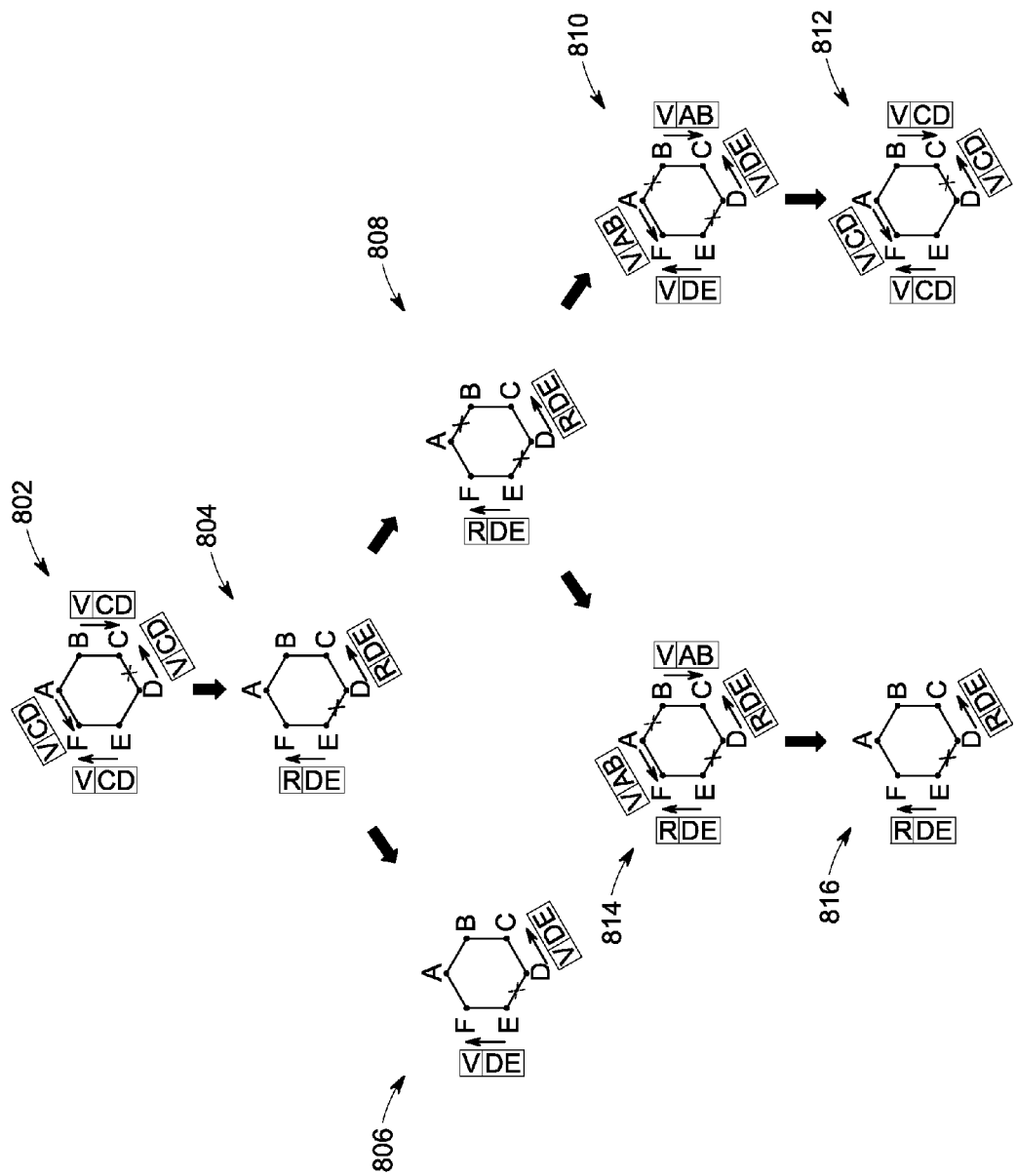
FIG. 8 illustrates different configurations to handle communication link fault for six terminals arranged in a ring topology, in accordance with one embodiment.

Various embodiment of the invention cater to changes in statuses of communication links, between terminals in a differential protection system (such as 100), dynamically during operation. FIG. 8 illustrates different configurations to handle communication link fault for six terminals A-F arranged in a ring topology, in accordance with one embodiment. FIG. 8 considers six terminals connected in a ring topology; however, any number of terminals may exist without deviating from the scope of the invention. Referring to a first configuration 802 of the ring topology, in one embodiment, a communication link between terminals C and D having an ID as "CD" may be determined to be virtually disconnected (shown by dashed cross). In this embodiment, either terminal C or D may send a message including "V" (to indicate the status of communication link as virtually disconnected) in its first bit and CD in its second bit to other terminals in the ring topology, similar to that described depicted in the message format 702. The message "V CD" as shown in FIG. 8 signifies that the communication link CD is a virtually disconnected communication link. In some embodiments where the clock synchronization logic of FIG. 5 is to applied, a master terminal A may be determined corresponding to the virtually disconnected communication link CD using the relationship depicted in the mapping table 600.

In some embodiments, a particular communication link may be determined to be faulty. Referring to a second configuration 804 of the ring topology, in one embodiment, a communication link between terminals D and E having an ID as "DE" may be determined to be faulty and hence the communication link DE may be isolated (shown by solid cross) from the ring topology. In such embodiments, the communication link CD, which is determined as virtually disconnected during the first configuration 802, may then be configured to be operational. Terminal D or E or both may then initiate a message with "R" in its first bit and DE in its second bit to other terminals in the ring topology. The message "R DE" as shown in FIG. 8 signifies that the communication link DE is faulty. In some embodiments where the clock synchronization logic of FIG. 5 is to applied, the terminal B may be set as the master terminal that corresponds to the faulty communication link DE determined using the relationship depicted in the mapping table 600.

Further, referring to a third configuration 806 of the ring topology, in one embodiment, upon detection of repair of the faulty communication link DE or replacement with a new communication link, the terminal D or terminal E or both may be configured to modify the message sent during the second configuration to "V" in its first bit and the communication link DE (shown by dashed cross) in its second bit to other terminals in the ring topology. The message "V DE" as shown in FIG. 8 signifies that the status of the communication link DE is changed from being faulty to being virtually disconnected. In some embodiments where the clock synchronization logic of FIG. 5 is to applied, the terminal B may remain unchanged as the master terminal.

Alternatively, in one embodiment, as shown in FIG. 8, a fourth configuration 808 (instead of the third configuration 806) of the ring topology may be considered subsequent to the second configuration 804. As shown in FIG. 8, the fourth configuration 808 considers the embodiment where the communication link DE is already faulty and another communication link, that is, between terminals A and B having an ID as "AB" is determined to be faulty and hence the communication link AB may be isolated (shown by solid cross) from the ring topology. Terminal A or B or both may then initiate a message with "R" in its first bit and AB in its second bit to other terminals in the ring topology. The message "R AB" as shown in FIG. 8 may signify that the communication link AB is faulty. In some embodiments, upon detection of two different messages ("R DE" and "R AB") both having "R" in their respective first bits, any terminal (for example, terminal D or E) in the ring topology may disable a differential protection function using a controller (similar to the controller 122, 124) in the respective terminal. In one embodiment, the differential protection function may be included in the fault detection unit 306. In some embodiments where the clock synchronization logic of FIG. 5 is to applied, the master terminal B may be configured to disable the differential protection function.

In order to enable the differential protection function, at least one of the two faulty communication links may have to recover (that is, repaired or replaced with a new communication link). One such embodiment is depicted in a fifth configuration 810 of the ring topology where both the faulty communications links AB and DE may be recovered simultaneously. In some embodiments, the differential protection function may be enabled, causing the terminals A and B to send a message with "V" in its first bit and the communication link AB (shown by dashed cross) in its second bit to other terminals in the ring topology. Simultaneously, the terminals D and E may also send a message with "V" in its first bit and the communication link DE (shown by dashed cross) in its second bit to other terminals in the ring topology. In some embodiments, upon detection of two different messages ("V AB" and "V DE") both having "V" in their respective first bits, the decision unit 308 may consider the communication links AB and DE as virtually disconnected (shown by dashed crosses). In some other embodiments (not shown) where the clock synchronization logic of FIG. 5 is to applied, all terminals in the ring topology may reset to the first configuration 802 where the terminal A is set as the master terminal.

In one embodiment, the fifth configuration 810 assumes that the terminals wait for a pre-defined time period before considering the communication links AB and DE as fully recovered. In such embodiments once the communication links AB and DE are full recovered, that is, once the transition is achieved, the communication link CD may be determined as virtually disconnected (shown by dashed cross) based on the mapping relationship of the master terminal A using the mapping table 600. This embodiment is depicted in a sixth configuration 812 of the ring topology. In another embodiment (not shown) of the sixth configuration 812, when the terminal A is not being set as the master terminal during the fifth configuration, all terminals in the ring topology may reset to the first configuration 802 where the communication link CD may be determined as the virtually disconnected communication link. In such embodiments where the clock synchronization logic of FIG. 5 is to applied, the terminal A corresponding to the communication link CD (determined from the mapping table 600) may be set as the master terminal.

Alternatively, in one embodiment, as shown in FIG. 8, a seventh configuration 814 (instead of the fifth and sixth configurations 810 and 812) of the ring topology may be considered subsequent to the fourth configuration 808. As shown in FIG. 8, the seventh configuration 814 considers the embodiment where one communication link AB may recover. In one embodiment, similar to the fifth configuration 810, the seventh configuration 814 assumes that the terminals wait for a pre-defined time period before considering the communication link AB as fully recovered. In such embodiments while waiting for the communication link AB to fully recover, the terminals A and B may send a message with "V" in its first bit and the communication link AB (shown by dashed cross) in its second bit to other terminals in the ring topology. Since the communication link DE is still faulty, the terminals D and E may continue sending a message with "R" in its first bit and the communication link DE (shown by solid cross) in its second bit to other terminals in the ring topology. In some embodiments, two different messages ("V AB" and "R DE") one having "V" in its first bit and the other with "R" in its first bit may be detected at various terminals.

In some embodiments where once the communication link AB has fully recovered as depicted in an eighth configuration 816 of the ring topology, the differential protection function may be enabled. In such embodiments, upon detection of two different messages ("V AB" and "R DE"), all terminals may discard the message "V AB" and may set the communication link DE as faulty (shown by solid cross). Further, in some embodiments where the clock synchronization logic of FIG. 5 is to applied, the terminal B may be determined as the master terminal based on the mapping relationship of the communication link DE using the mapping table 600.

FIG. 9 describes one exemplary embodiment to handle communication link fault for terminals arranged in the ring topology. In various embodiments, the communication link fault may be similarly handled for terminals arranged in a mesh topology using any of the above described clock synchronization logic. One such example is illustrated in FIG. 9. FIG. 9 illustrates different configurations to handle communication link fault for four terminals A-D arranged in a mesh topology, in accordance with another embodiment. FIG. 9 considers four terminals connected in a mesh topology; however, any number of terminals may exist without deviating from the scope of the invention.

FIG. 9 considers the existing master-slave approach to synchronize terminals of the mesh topology. As described above, in various embodiments, any terminal that has connection to all other terminals may be a potential candidate for acting as a master terminal. Referring to a first configuration 902 of the mesh topology, in one embodiment where none of the communication links between terminals of the mesh topology is faulty, any terminal (terminal A is shown as an example master terminal in the first configuration 902) may be set as the master terminal with all other terminals in the mesh topology acting as slave terminals that may synchronize directly with the master terminal A.

Referring to a second configuration 904 of the mesh topology, in one embodiment, a communication link between terminals C and D (referred to as "CD") may be determined as faulty (shown by solid cross). In such an embodiment, the master terminal may remain unchanged as terminal A since the master terminal A is still connected to all other terminals. Alternatively, in another embodiment, the terminal A may be replaced with terminal B as the master terminal since even the terminal B is connected to all other terminals.

Referring to a third configuration 906 of the mesh topology, in one embodiment, assumes that the communication link CD has recovered or is not faulty and a communication link between terminals A and D (referred to as "AD") may be faulty (shown by solid cross). In such an embodiment, the terminal A may be replaced with terminal B or C (terminal B is shown as an example master terminal in the third configuration 906) as the master terminal since the master terminal A is not connected to all other terminals.

Referring to a fourth configuration 908 of the mesh topology, in one embodiment, a communication link between terminals B and C (referred to as "BC") and the communication link CD may be determined as faulty (both shown by solid crosses). In such an embodiment, the terminal A may be set as the master terminal (assuming it is not already set as the master terminal) since the master terminal A is the only terminal connected to all other terminals in the fourth configuration 908.

Referring to a fifth configuration 910 of the mesh topology, in one embodiment, a communication link between terminals A and B (referred to as "AB") and the communication link CD may be determined as faulty (both shown by solid crosses). In such an embodiment, no terminal may be set as the master terminal since none of the terminals will be connected to all other terminals. Considering that the faulty links AB and CD do not exist, the mesh topology in the fifth configuration may be re-arranged to form a ring topology with each terminal connected to exactly two other terminals. Thereafter, in some embodiments, any of the above described clock synchronization logic for the ring topology may be used. In an exemplary embodiment, the ring topology may be converted to a daisy chain topology and then the clock synchronization logic described in various embodiments of FIG. 4 or FIG. 5 may be used.

Figure 10:
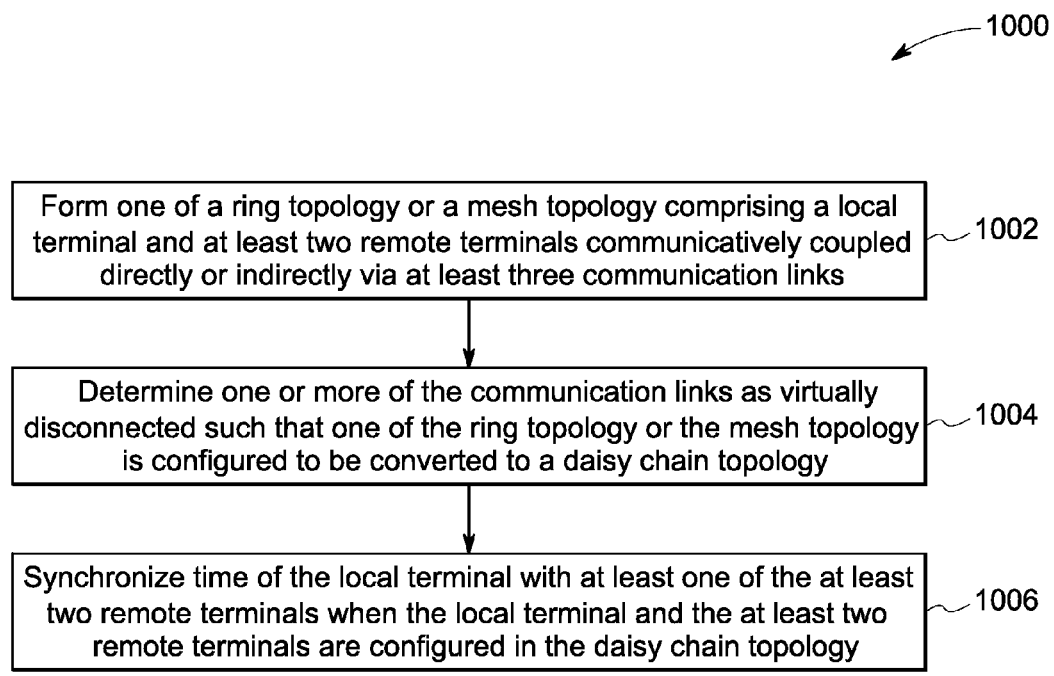
FIG. 10 is a flowchart depicting a method for differential protection that enables synchronization of clocks at multiple terminals, in accordance with one embodiment.

In one embodiment, a method for differential protection is presented. FIG. 10 is a flowchart depicting a method 1000 for differential protection that enables synchronization of clocks at multiple terminals, in accordance with one embodiment. In an exemplary embodiment, the terminals may be protection relays, for example, built on a common platform like a protection universal relay (UR) family. At step 1002, a ring topology or a mesh topology may be provided. The ring/mesh topology may include a local terminal and two or more remote terminals communicatively coupled to each other directly or indirectly via three or more communication links. Any terminal in the ring/mesh topology may act as local terminal with other terminals acting as remote terminals. In an exemplary embodiment, the ring topology may include three terminals having three communication links (as depicted in FIG. 1) or six terminals having six communication links (as depicted in FIG. 6). Similarly, in another exemplary embodiment, the mesh topology may include four terminals having six communication links (depicted in FIG. 2).

In order to avoid formation of "synchronization islands" and handle fault in one or more communication links (as described above), at step 1004, one or more communication links between terminals arranged in the ring/mesh topology may be determined as virtually disconnected (for example, using the decision unit 308 deployed in each terminal). In one exemplary embodiment, the communication link(s) may be determined as virtually disconnected based on a first defined priority list as described above. Considering the virtually disconnected link(s) as not existing for the purpose of clock synchronization may result in conversion of the ring/mesh topology to a daisy chain topology as shown in FIGS. 4 and 5. Six terminals as shown in FIGS. 4 and 5 are connected serially with the two terminals A and F at the end of the daisy chain topology being considered as not communicatively coupled ("virtually disconnected") to each other even though the communication link AF between terminals A and F may be physically existing and operating normally.

Further at step 1006, time of the local terminal may be synchronized with that of the remote terminals, when the local terminal and the remote terminals are configured in the daisy chain topology. In some embodiments, once the terminals in the ring/mesh topology are converted to the daisy chain topology, any of the above described clock synchronization logic may be used to synchronize the terminals (for example, using the clock unit 310). For example, clock synchronization logic that uses one or more neighboring terminals is described above in various embodiments of FIGS. 4 and 5. Various embodiments described above in conjunction with FIGS. 1-9 above may be equally applied to the method 1000 for differential protection.

The systems and methods in accordance with embodiments of the invention may provide differential protection system and method with multiple terminals arranged in a ring topology or a mesh topology such that no "synchronization islands" are formed during clock synchronization of these terminals. Moreover, in various embodiments of the present invention, the clock synchronization may be achieved between multiple terminals without the need for GPS. Also, the clock synchronization logic described in various embodiments of the invention may omit the clock rollover issue by using time delays between terminals, instead of relying on absolute time, and using minimal bits to exchange messages between terminals for clock synchronization. Further, various embodiments of the invention may handle changes in statuses of communication links (for example, in the event of fault in one or more communication links), between terminals in the differential protection system (such as 100), dynamically during operation. Additionally, various embodiments of the invention may handle faults in one or communication links without the need to re-route messages (for example, including timing information) between affected terminals (that is, terminals that are connected via the faulty communication link).

The systems and methods described in various embodiments of the invention may be applied to any type of protection system, and is not limited to UR family of protection. Various embodiments of the invention are not limited to use in application areas such as electrical power system, and may be extended to any other type of application areas, such as to computer networks, mobile communication networks, or the like.

Various embodiments of the invention may take the form of an entirely hardware embodiment, an entirely software embodiment, or an embodiment containing both hardware and software components. In accordance with an embodiment of the present invention, the invention may be implemented in software, which includes but is not limited to firmware, resident software, or microcode.

Furthermore, the invention may take the form of a computer program product, accessible from a non-transitory computer-usable or computer-readable medium, providing program code for use by, or in connection with, a computer or any instruction execution system. For the purposes of this description, a computer-usable or computer readable medium may be any apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CDROM), compact disk-read/write (CD-R/W), and Digital Versatile Disk (DVD).

A non-transitory computer-readable medium provided herein includes computer-readable instructions of a computer program, which when executed by a processor, causes the processor to perform a method. The non-transitory computer-readable medium further includes computer-readable instructions to perform the method for providing one of a ring topology or a mesh topology comprising a local terminal and at least two remote terminals, wherein the local terminal is configured to be communicatively coupled directly or indirectly with the at least two remote terminals via at least three communication links. The non-transitory computer-readable medium further includes computer-readable instructions to perform the method for determining at least one of the at least three communication links as virtually disconnected such that one of the ring topology or the mesh topology of the local terminal and the at least two remote terminals is configured to be converted to a daisy chain topology. The non-transitory computer-readable medium further includes computer-readable instructions to perform the method for synchronizing time of the local terminal with at least one of the at least two remote terminals when the local terminal and the at least two remote terminals are configured in the daisy chain topology.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system, comprising:
   a local terminal configured to be communicatively coupled directly or indirectly with at least two remote terminals via at least three communication links to form one of a ring topology or a mesh topology; and
   a controller comprising:
      a communication link decision unit configured to determine at least one of the at least three communication links as virtually disconnected such that one of the ring topology or the mesh topology of the local terminal and the at least two remote terminals is configured to be converted to a daisy chain topology,
      a clock unit associated with the local terminal, wherein the clock unit is configured to time synchronize the local terminal with at least one of the at least two remote terminals when the local terminal and the at least two remote terminals are configured in the daisy chain topology;
      a fault detection unit to detect a fault in at least one communication link of the at least three communication links;
   wherein the communication link decision unit is further configured to:
      receive an indication from the fault detection unit for the fault in the at least one communication link;
      define the determined virtually disconnected communication link as an operational link, when the at least one faulty communication link is different from the determined virtually disconnected communication link; and
      define the at least one communication link as the at least one faulty communication link based on the indication received from the fault detection unit.

2. The system of claim 1, wherein the daisy chain topology comprises:
   at least two terminals from: the local terminal and the at least two remote terminals configured to act as opposing end terminals of the daisy chain topology, and
   terminals other than the opposing end terminals configured to act as intermediate terminals of the daisy chain topology.

3. The system of claim 2, wherein when the local terminal is configured to act as one of the opposing end terminals of the daisy chain topology, the clock unit is configured to:
   receive timing information from a neighboring terminal of the local terminal, wherein the neighboring terminal comprising one of the at least two remote terminals, and
   time synchronize the local terminal with the neighboring terminal based on the received timing information from the neighboring terminal.

4. The system of claim 2, wherein when the local terminal is configured to act as one of the intermediate terminals of the daisy chain topology, the clock unit is configured to:
   receive timing information from two neighboring terminals of the local terminal, wherein the two neighboring terminals comprising two of the at least two remote terminals,
   determine time delays between the local terminal and the two neighboring terminals based on the received timing information, and
   calculate an average of the determined time delays between the local terminal and the two neighboring terminals so as to time synchronize the local terminal.

5. The system of claim 1, wherein the communication link decision unit is configured to determine the at least one of the at least three communication links as virtually disconnected based on a first defined priority list.

6. The system of claim 1, wherein the controller further comprises a master determination unit configured to determine one terminal from: the local terminal and the at least two remote terminals as a first master terminal, and further configured to define terminals other than the first master terminal as slave terminals, wherein the daisy chain topology comprising the first master terminal and the slave terminals.

7. The system of claim 6, wherein when the local terminal is the slave terminal, the clock unit is configured to:
   receive timing information from a neighboring terminal of the local terminal nearest to the first master terminal, when the neighboring terminal of the local terminal nearest to the first master terminal comprising one of the at least two remote terminals, and
   time synchronize the local terminal with the neighboring terminal of the local terminal nearest to the first master terminal based on the received timing information from the neighboring terminal of the local terminal nearest to the first master terminal.

8. The system of claim 6, wherein when the local terminal is the slave terminal, the clock unit is configured to:
   receive timing information from the first master terminal when the first master terminal is a neighboring terminal of the local terminal, wherein the first master terminal comprising one of the at least two remote terminals, and
   time synchronize the local terminal with the first master terminal based on the received timing information from the first master terminal.

9. The system of claim 6, wherein the master determination unit is configured to determine the first master terminal based on a second defined priority list.

10. The system of claim 6, wherein the communication link decision unit is further configured to:
    receive data indicating the determined first master terminal from the master determination unit, and
    determine the virtually disconnected communication link based on the received data.

11. The system of claim 6, wherein the master determination unit is further configured to:
    receive data indicating the virtually disconnected communication link from the communication link decision unit, and
    determine the first master terminal based on the received data.

12. The system of claim 6, further comprising a mapping unit configured to store a mapping between the first master terminal and the virtually disconnected communication link.

13. The system of claim 1, further comprising a message communication unit configured to exchange one or more first messages between the local terminal and the at least two remote terminals, and among the at least two remote terminals, wherein the one or more first messages comprise:
  a first data indicating at least one of the virtually disconnected communication link or a first master terminal, and
  at least one of a first link identification (ID) or a first master ID.

14. The system of claim 1, further comprising a message communication unit configured to exchange one or more second messages between the local terminal and the at least two remote terminals, and among the at least two remote terminals, wherein the one or more second messages comprise:
  a second data indicating at least one of the at least one faulty communication link or a second master terminal, and
  at least one of a second link ID or a second master ID.

15. The system of claim 1, further comprising a master determination unit configured to replace a first master terminal with a second master terminal, when the at least one faulty communication link is different from the determined virtually disconnected communication link.

16. A method, comprising:
  providing one of a ring topology or a mesh topology comprising a local terminal and at least two remote terminals, wherein the local terminal is configured to be communicatively coupled directly or indirectly with the at least two remote terminals via at least three communication links;
  determining at least one of the at least three communication links as virtually disconnected such that one of the ring topology or the mesh topology of the local terminal and the at least two remote terminals is configured to be converted to a daisy chain topology;
  synchronizing time of the local terminal with at least one of the at least two remote terminals when the local terminal and the at least two remote terminals are configured in the daisy chain topology;
  detecting a fault in at least one communication link of the at least three communication links;
  receiving an indication for the fault in the at least one communication link;
  defining the determined virtually disconnected communication link as an operational link, when the at least one faulty communication link is different from the determined virtually disconnected communication link; and
  defining the at least one communication link as the at least one faulty communication link based on the received indication.

17. The method of claim 16, wherein the daisy chain topology comprises:
  at least two terminals from: the local terminal and the at least two remote terminals configured to act as opposing end terminals of the daisy chain topology, and
  terminals other than the opposing end terminals configured to act as intermediate terminals of the daisy chain topology.

18. The method of claim 17, wherein when the local terminal is configured to act as one of the opposing end terminals of the daisy chain topology, the synchronizing comprises:
  receiving timing information from a neighboring terminal of the local terminal, wherein the neighboring terminal comprising one of the at least two remote terminals, and
  synchronizing time of the local terminal with the neighboring terminal based on the received timing information from the neighboring terminal.

19. The method of claim 17, wherein when the local terminal is configured to act as one of the intermediate terminals of the daisy chain topology, the synchronizing comprises:
  receiving timing information from two neighboring terminals of the local terminal, wherein the two neighboring terminals comprising two of the at least two remote terminals,
  determining time delays between the local terminal and the two neighboring terminals based on the received timing information, and
  calculating an average of the determined time delays between the local terminal and the two neighboring terminals.

20. The method of claim 16, wherein the at least one of the at least three communication links is determined as virtually disconnected based on a first defined priority list.

21. The method of claim 16, further comprising:
  determining one terminal from: the local terminal and the at least two remote terminals as a first master terminal, and
  defining terminals other than the first master terminal as slave terminals, wherein the daisy chain topology comprising the first master terminal and the slave terminals.

22. The method of claim 21, wherein when the local terminal is the slave terminal, the synchronizing comprises:
  receiving timing information from a neighboring terminal of the local terminal nearest to the first master terminal, when the neighboring terminal of the local terminal nearest to the first master terminal comprising one of the at least two remote terminals, and
  synchronizing time of the local terminal with the neighboring terminal of the local terminal nearest to the first master terminal based on the received timing information from the neighboring terminal of the local terminal nearest to the first master terminal.

23. The method of claim 21, wherein when the local terminal is the slave terminal, the synchronizing comprises:
  receiving timing information from the first master terminal when the first master terminal is a neighboring terminal of the local terminal, wherein the first master terminal comprising one of the at least two remote terminals, and
  synchronizing time of the local terminal with the first master terminal based on the received timing information from the first master terminal.

24. The method of claim 21, wherein the first master terminal is determined based on a second defined priority list.

25. The method of claim 21, wherein the determining comprises:
  receiving data indicating the determined first master terminal, and
  determining the virtually disconnected communication link based on the received data.

26. The method of claim 21, wherein determining the first master terminal comprises:
  receiving data indicating the virtually disconnected communication link, and
  determining the first master terminal based on the received data.

27. The method of claim 21, further comprising storing a mapping between the first master terminal and the virtually disconnected communication link.

28. The method of claim 16, further comprising exchanging one or more first messages between the local terminal and the at least two remote terminals, and among the at least two remote terminals, wherein the one or more first messages comprise:
- a first data indicating at least one of the virtually disconnected communication link or a first master terminal, and
- at least one of a first link ID or a first master ID.

29. The method of claim 16, further comprising exchanging one or more second messages between the local terminal and the at least two remote terminals, and among the at least two remote terminals, wherein the one or more second messages comprise:
- a second data indicating at least one of the at least one faulty communication link or a second master terminal, and
- at least one of a second link ID or a second master ID.

30. The method of claim 16, further comprising:
- replacing a first master terminal with a second master terminal, when the at least one faulty communication link is different from the determined virtually disconnected communication link,
- receiving timing information from a neighboring terminal of the local terminal nearest to the second master terminal, when the neighboring terminal of the local terminal nearest to the second master terminal comprising one of the at least two remote terminals, and
- synchronizing time of the local terminal with the neighboring terminal of the local terminal nearest to the second master terminal based on the received timing information from the neighboring terminal of the local terminal nearest to the second master terminal.

31. The method of claim 16, further comprising:
- replacing a first master terminal with a second master terminal, when the at least one faulty communication link is different from the determined virtually disconnected communication link,
- receiving timing information from the second master terminal when the second master terminal is a neighboring terminal of the local terminal, wherein the second master terminal comprising one of the at least two remote terminals, and
- synchronizing time of the local terminal with the second master terminal based on the received timing information from the second master terminal.

32. A non-transitory computer-readable medium comprising computer-readable instructions of a computer program that, when executed by a processor, cause the processor to perform a method, the method comprising:
- providing one of a ring topology or a mesh topology comprising a local terminal and at least two remote terminals, wherein the local terminal is configured to be communicatively coupled directly or indirectly with the at least two remote terminals via at least three communication links;
- determining at least one of the at least three communication links as virtually disconnected such that one of the ring topology or the mesh topology of the local terminal and the at least two remote terminals is configured to be converted to a daisy chain topology;
- synchronizing time of the local terminal with at least one of the at least two remote terminals when the local terminal and the at least two remote terminals are configured in the daisy chain topology;
- detecting a fault in at least one communication link of the at least three communication links;
- receiving an indication for the fault in the at least one communication link;
- defining the determined virtually disconnected communication link as an operational link, when the at least one faulty communication link is different from the determined virtually disconnected communication link; and
- defining the at least one communication link as the at least one faulty communication link based on the received indication.

* * * * *